United States Patent
Walters et al.

(10) Patent No.: US 7,019,502 B2
(45) Date of Patent: Mar. 28, 2006

(54) SYNCHRONIZATION OF MULTIPHASE SYNTHETIC RIPPLE VOLTAGE REGULATOR

(75) Inventors: Michael M. Walters, Apex, NC (US); Xuening Li, Cary, NC (US); Thomas A. Jochum, Durham, NC (US)

(73) Assignee: Intersil America's Inc., Milpitas, CA (US)

( * ) Notice: Subject to any disclaimer, the term of this patent is extended or adjusted under 35 U.S.C. 154(b) by 70 days.

(21) Appl. No.: 10/853,022

(22) Filed: May 25, 2004

(65) Prior Publication Data

US 2005/0001597 A1    Jan. 6, 2005

Related U.S. Application Data

(63) Continuation-in-part of application No. 10/673,684, filed on Sep. 29, 2003, now Pat. No. 6,922,044, which is a continuation-in-part of application No. 10/236,787, filed on Sep. 6, 2002, now Pat. No. 6,791,306.

(51) Int. Cl.
    $G05F\ 1/40$    (2006.01)
(52) U.S. Cl. .................. 323/282; 323/284; 323/222
(58) Field of Classification Search ........ 323/282–288, 323/222, 268, 272; 363/72, 89, 97, 16, 98
    See application file for complete search history.

(56) References Cited

U.S. PATENT DOCUMENTS

| | | | |
|---|---|---|---|
| 4,413,224 A | 11/1983 | Krupka et al. | |
| 4,521,726 A | 6/1985 | Budnik | |
| 4,658,204 A | 4/1987 | Goodwin | |
| 5,399,958 A | 3/1995 | Iyoda | |
| 5,705,919 A * | 1/1998 | Wilcox | 323/282 |
| 5,731,694 A * | 3/1998 | Wilcox et al. | 323/287 |
| 5,747,977 A * | 5/1998 | Hwang | 323/284 |
| 6,147,478 A | 11/2000 | Skelton et al. | |
| 6,307,360 B1 * | 10/2001 | Kajiwara et al. | 323/282 |
| 6,433,525 B1 | 8/2002 | Muratov et al. | |
| 6,456,050 B1 * | 9/2002 | Agiman | 323/282 |
| 6,495,995 B1 | 12/2002 | Groom et al. | |
| 6,583,610 B1 | 6/2003 | Groom et al. | |

FOREIGN PATENT DOCUMENTS

| | | |
|---|---|---|
| DE | 3343883 A1 | 6/1984 |
| DE | 42 06 478 A1 | 9/1993 |
| EP | 0 650 250 A1 | 4/1995 |
| EP | 0 883 051 A1 | 12/1998 |
| EP | 1 073 187 A2 | 1/2001 |
| FR | 2 610 149 A1 | 7/1988 |

* cited by examiner

*Primary Examiner*—Rajnikant B. Patel
(74) *Attorney, Agent, or Firm*—Gary R. Stanford (57) ABSTRACT

A multiphase synthetic ripple voltage generator for a multiphase DC-DC regulator including a master clock circuit that generates a master clock signal, sequence logic and a ripple regulator for each phase. The DC-DC regulator includes multiple switching circuits, each responsive to a corresponding PWM signal to switch input voltages via a phase node through an output inductor to develop an output voltage. The sequence logic sets each PWM signal in sequential order based on the master clock signal. Each ripple generator includes a transconductance amplifier, a ripple capacitor and a comparator. The transconductance amplifier has an input coupled to a corresponding output inductor and an output coupled to a corresponding ripple capacitor. The comparator has a first input coupled to the ripple capacitor, a second input receiving an error voltage, and an output coupled to the sequence logic for resetting a corresponding PWM signal.

26 Claims, 5 Drawing Sheets

SYNCHRONIZATION OF MULTIPHASE SYNTHETIC RIPPLE VOLTAGE REGULATOR

CROSS-REFERENCE TO RELATED APPLICATIONS

This application is a continuation-in-part (CIP) and commonly assigned U.S. patent application Ser. No. 10/673,684, filed on Sep. 29, 2003, now U.S. Pat. No. 6,922,044, which itself is a CIP and commonly assigned U.S. patent application Ser. No. 10/236,787 filed on Sep. 6, 2002, now U.S. Pat. No. 6,791,306, in which both are incorporated herein by reference for all intents and purposes.

BACKGROUND OF THE INVENTION

1. Field of the Invention

The present invention relates in general to power supply circuits and related components, and is particularly directed to an arrangement for synchronizing a plurality of synthetic ripple generators that generate artificial or synthesized ripple waveforms to control switching operations of a multiphase DC-DC synthetic ripple regulator.

2. Description of the Related Art

Electrical power for integrated circuits is typically supplied by one or more direct current (DC) power sources. In a number of applications the circuit may require multiple regulated voltages that are different from the available supply voltage (which may be relatively low e.g., on the order of a few volts or less, particularly where low current consumption is desirable, such as in portable, battery-powered devices). Moreover, in many applications the load current may vary over several orders of magnitude. To address these requirements it has been common practice to employ pulse or ripple-based regulators, such as a hysteresis or 'bang-bang' regulator.

Such a ripple-based DC-DC voltage regulator employs a relatively simple control mechanism and provides a fast response to a load transient. The switching of the ripple regulator is asynchronous, which is advantageous in applications where direct control of the switching edges is desired. For this purpose, a ripple regulator typically employs a hysteresis comparator or the like that controls a gate drive circuit coupled to the control or gate drive inputs of a pair of electronic power switching devices, such as FETs or MOSFETS or the like. The gate drive circuit controllably switches or turns the switching devices on and off in accordance with a pulse width modulation (PWM) switching waveform as known to those skilled in the art.

In such a hysteretic or 'bang-bang' regulator, the output PWM signal waveform produced by hysteresis comparator transitions to a first state (e.g., goes high) when the output voltage falls below a reference voltage minus the comparator's inherent hysteresis voltage and the comparator's PWM output transitions to a second state (e.g., goes low) when the output voltage exceeds the reference voltage plus the hysteresis voltage. The application of or increase in load causes the output voltage to decrease below the reference voltage, in response to which the comparator triggers the gate drive to turn on the upper switching device. Because the regulator is asynchronous, the gate drive control signal does not wait for a synchronizing clock, as is common in most fixed frequency PWM control schemes.

Principal concerns with this type of ripple regulator include large ripple voltage, DC voltage accuracy, and switching frequency. Since the hysteretic comparator directly sets the magnitude of the ripple voltage, employing a smaller hysteresis voltage reduces the power conversion efficiency, as switching frequency increases with smaller hysteresis. In order to control the DC output voltage, which is a function of the ripple wave shape, the peaks and valleys of the output ripple voltage is regulated. The DC value of the output voltage is a function of the PWM duty factor. The output voltage wave shape also changes at light loads, when current through the output inductor becomes discontinuous, producing relatively short 'spikes' between which are relatively long periods of low voltage. Since the ripple voltage wave shape varies with input line and load conditions, maintaining tight DC regulation is difficult.

In addition, improvements in capacitor technology changes the ripple wave shape. In particular, the current state of ceramic capacitor technology has enabled the equivalent series resistance or ESR (which produces the piecewise linear or triangular wave shape of the output voltage waveform) of ceramic capacitors to be reduced to very low values. At very low values of ESR, however, the output voltage's ripple shape changes from triangular to a non-linear shape (e.g., parabolic and sinusoidal). This causes the output voltage to overshoot the hysteretic threshold, and results in higher peak-to-peak ripple. As a result, the very improvements that were intended to lower the output voltage ripple in DC-DC regulators can actually cause increased ripple when used in a ripple regulator.

A first prior disclosure incorporated herein by reference introduced a synthetic ripple regulator that includes a synthetic ripple voltage generator. As described therein, the generator creates an auxiliary or "synthetic" ripple voltage that effectively replicates the ripple current through the output inductor. The regulator uses the synthetically generated ripple voltage to control toggling of a hysteretic comparator to develop the pulse width modulation (PWM) signal that controls switching of the regulator. In a non-limiting implementation, a transconductance amplifier monitors the phase node voltage of the inductor and supplies an inductor voltage-representative current to a ripple capacitor, which produces the synthetic ripple voltage. Using the replicated inductor current for ripple regulation results in low output ripple, input voltage feed forward, and simplified compensation.

A second prior disclosure incorporated herein by reference introduced a multiphase ripple voltage regulator which employed a hysteretic comparator referenced to upper and lower voltage thresholds. As described therein, the hysteretic comparator monitors a master ripple voltage waveform developed across a capacitor supplied with a current based on the difference between the output voltage and either the input voltage or ground. The output of the hysteretic comparator generates a master clock signal that is sequentially coupled to PWM latches, the states of which define the durations of respective components of the synthesized ripple voltage. A respective PWM latch has a first state initiated by a selected master clock signal and terminated by an associated-phase voltage comparator that monitors a respective-phase synthesized voltage. The present disclosure concerns improvements and/or variations of the multiphase synthetic ripple voltage regulator.

SUMMARY OF THE INVENTION

A multiphase synthetic ripple voltage generator for a multiphase DC-DC regulator according to an embodiment of the present invention includes a master clock circuit that generates a master clock signal, sequence logic and a ripple regulator for each phase or channel. The multiphase DC-DC regulator includes multiple switching circuits, each responsive to a corresponding pulse width modulation (PWM) signal to switch one or more input voltages via a corresponding phase node through a corresponding output inductor to collectively develop an output voltage at an output node. The sequence logic sets each PWM signal in sequential order based on the master clock signal. Each ripple generator includes a transconductance amplifier, a ripple capacitor and a comparator. The transconductance amplifier has an input for coupling to a corresponding output inductor and an output coupled to a corresponding ripple capacitor. The comparator has a first input coupled to the ripple capacitor, a second input receiving an error voltage, and an output coupled to the sequence logic for resetting a corresponding PWM signal.

The transconductance amplifier of each phase may be configured with a non-inverting input for coupling to a corresponding phase node and an inverting input for coupling to either the output node or to a reference voltage. The ripple capacitor has a first end coupled to the output of the transconductance amplifier and a second end coupled to ground or for coupling to the output node. A ripple resistor may be coupled to the ripple capacitor, and is either biased with a voltage source or referenced to the output voltage via the output node.

In one embodiment, a single input voltage is used and the master clock circuit includes a master ripple capacitor, a master transconductance amplifier circuit and a hysteretic comparator circuit. The master transconductance amplifier circuit has an output coupled to the master ripple capacitor and has first and second states controlled by the master clock signal. The first state is provided for charging the master ripple capacitor based on a voltage difference between the input voltage and the output voltage and the second state is provided for discharging the master ripple capacitor based on the output voltage. The hysteretic comparator circuit has an input coupled to compare the voltage of the master ripple capacitor with the error voltage and an output that provides the master clock signal.

The master transconductance amplifier circuit may include first and second transconductance amplifiers and a switch circuit. In this case, the first master transconductance amplifier has a first input receiving the input voltage, a second input receiving the output voltage and an output. The second master transconductance amplifier has a first input coupled to ground, a second input receiving the output voltage and an output. The switch circuit has a first terminal coupled to the output of the first master transconductance amplifier, a second terminal coupled to the output of the second master transconductance amplifier, a common terminal coupled to the master ripple capacitor, and a control input that receives a signal indicative of the master clock signal for coupling the common terminal to a selected one of the first and second terminals of the switch circuit.

The hysteretic comparator circuit may include first and second comparators, a voltage source and a set-reset device. The voltage source provides an offset voltage relative to the error voltage. The first comparator has a first input coupled to the master ripple capacitor, a second input receiving the error voltage, and an output. The second comparator has a first input receiving the offset voltage, a second input coupled to the master ripple capacitor, and an output. The set-reset device has a first input coupled to the output of the first comparator, a second input coupled to the output of the second comparator, and an output providing the master clock signal.

In an alternative embodiment, the master clock circuit includes a master ripple capacitor, a master transconductance amplifier, a voltage source, a comparator, a one-shot device and a switch. The master transconductance amplifier has an input receiving either the output voltage or a reference voltage and an output coupled to the master ripple capacitor. The voltage source provides an offset voltage relative to the error voltage. The comparator has a first input coupled to the master ripple capacitor, a second input receiving the offset voltage, and an output. The one-shot device has an input coupled to the output of the comparator and an output providing the master clock signal. The switch has a first terminal coupled to receive the error voltage, a second terminal coupled to the master ripple capacitor, and a control input receiving the master clock signal.

A multiphase synthetic ripple regulator according to an embodiment of the present invention includes multiple switching circuits, multiple output inductors, an error amplifier, a hysteretic comparator clock circuit, sequence logic, and a ripple generator for each phase. Each switching circuit alternately couples a corresponding phase node to opposite polarities of a corresponding input voltage based on a corresponding PWM signal. Each output inductor is coupled between a corresponding phase node and an output node that develops a regulated output voltage. The error amplifier generates an error voltage based on the regulated output voltage compared to a reference voltage. The hysteretic comparator clock circuit is responsive to the output voltage and the error signal and generates a master clock signal. The sequence logic initiates each PWM signal in sequential order based on the master clock signal. Each ripple generator includes a transconductance amplifier, a ripple capacitor, and a comparator. The transconductance amplifier has an input for coupling to a corresponding phase node and an output coupled to a corresponding ripple capacitor. The comparator has a first input coupled to the ripple capacitor, a second input receiving the error voltage, and an output coupled to the sequence logic for terminating a corresponding PWM signal.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
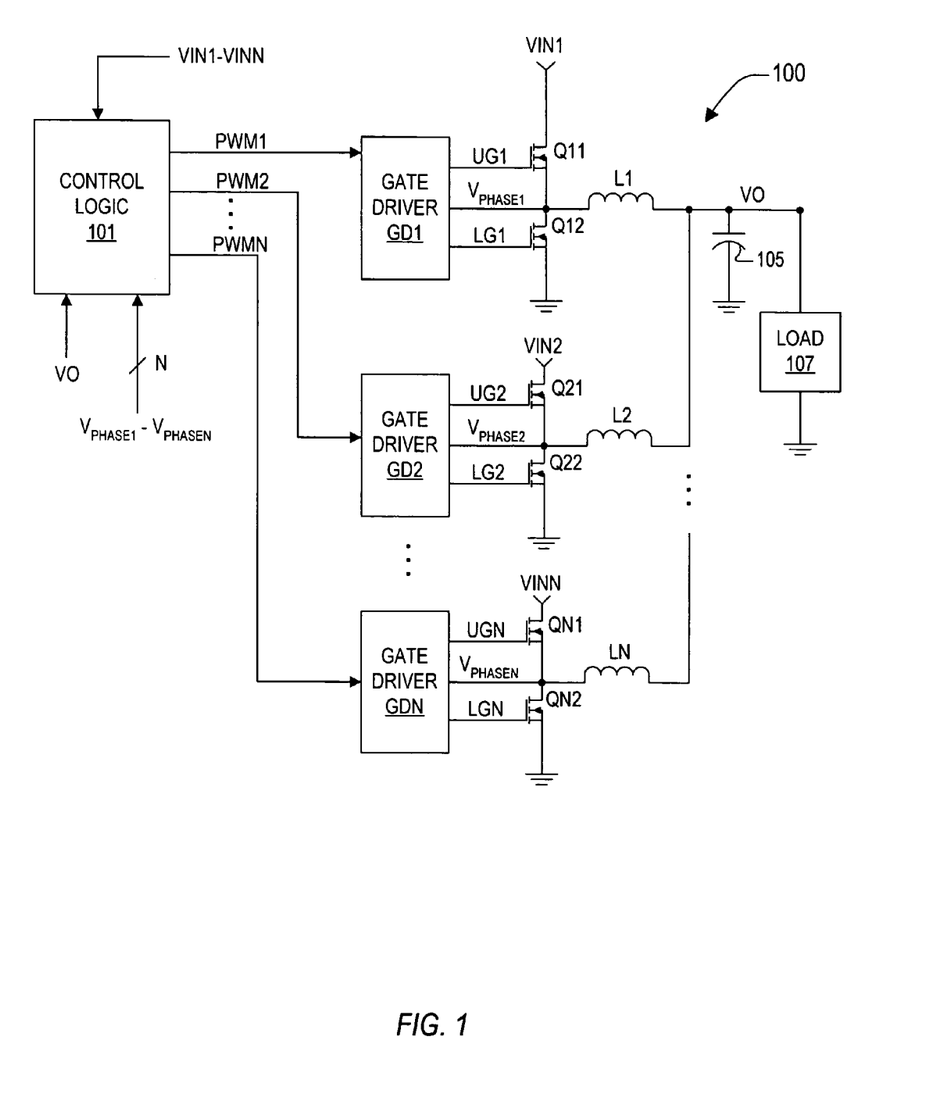
FIG. 1 is a simplified schematic and block diagram of a multiphase synthetic ripple voltage regulator implemented according to an exemplary embodiment of the present invention.

FIG. 1 is a simplified schematic and block diagram of a multiphase synthetic ripple voltage regulator 100 implemented according to an exemplary embodiment of the present invention. The multiphase regulator 100 includes a pulse width modulation (PWM) controller or a multiphase synthetic ripple voltage generator 101, which provides a number "N" of PWM signals PWM1, PWM2, ..., PWMN to respective N gate drivers GD1, GD2, ..., GDN forming N channels for the regulator 100. The number N is any positive integer greater than one, including N=2 for the two-phase case. For the first channel, the PWM1 signal is provided to the first gate driver GD1, which controls the turn-on and turn-off of a pair of electronic power switching devices or switches Q11 and Q12. In particular, the gate driver GD1 generates an upper gate switching signal UG1 provided to the control terminal (e.g., gate) of the upper (or high side) switch Q11 and generates a lower gate switching signal LG1 provided to the control terminal of the lower (or low side) switch Q12. In the particular configuration shown, the switches Q11 and Q12 are depicted as N-channel metal-oxide semiconductor field-effect transistors (MOSFETs) having their drain-source current paths coupled in series between a pair of input power supply terminals. In the configuration shown, the input power supply terminals develop an input voltage VIN1 referenced to ground (GND). Other types of electronic switching devices are contemplated. The drain of switch Q12 is coupled to the source of switch Q11 at a phase node $V_{PHASE1}$, which is coupled to one end of an output inductor L1. The other end of the inductor L1 is coupled to a common output node VO developing the output signal VO. A node and the signal it develops are referred to herein with the same name unless otherwise indicated.

The remaining channels 2–N of the regulator 100 are configured in substantially the same manner as the first channel. The PWM2 (or PWMN) signal is provided to the gate driver GD2 (or GDN), which provides signals UG2 and LG2 (or UGN and LGN) to drive switches Q21 and Q22 (or QN1 and QN2) coupled together at phase node $V_{PHASE2}$ (or $V_{PHASEN}$) between an input voltage terminals, such as VIN2 (or VINN) referenced to ground. In one embodiment, the input voltages VIN1–VINN are the same voltage level and in an alternative embodiment, one or more phases may receive a different input voltage level. The phase node $V_{PHASE2}$ (or $V_{PHASEN}$) is coupled through output inductor L2 (or LN) to VO. The VO node is coupled to a load reservoir capacitor 105 and to a load 107 both referenced to a power supply rail (e.g., GND). The VIN and VO signals are fed back to the multiphase synthetic ripple voltage generator 101. The multiple phases or channels of the multiphase regulator 100 are coupled in parallel to develop the VO signal. For the multiphase regulator 100, each channel includes a separate phase node and output inductor. Each of the phase nodes $V_{PHASE1}$–$V_{PHASEN}$ of each channel exhibits large and fast transitions, effectively switching between VIN and ground or 0V, whereas the output node developing the VO signal remains relatively stable. Thus, each inductor L1–LN develops a relatively large, triangular-shaped ripple current signal during operation.

Figure 2:
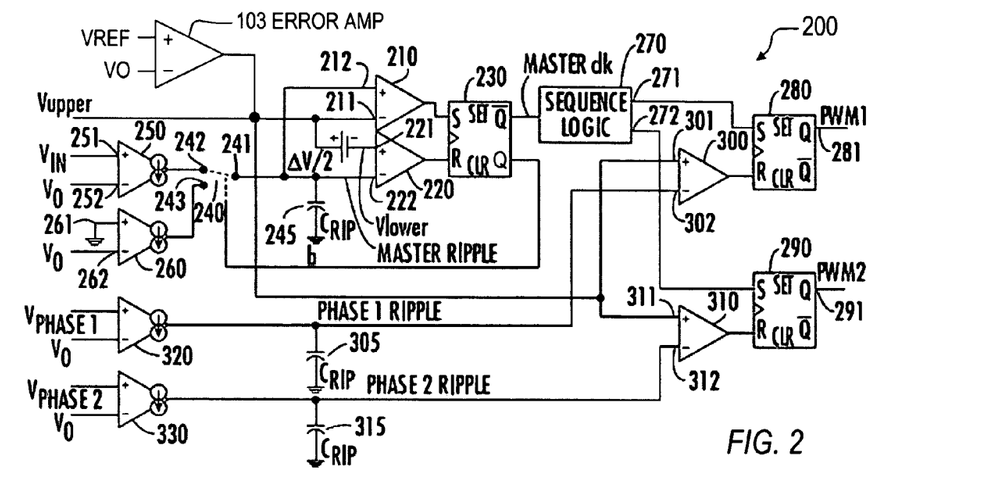
FIG. 2 is a simplified schematic diagram of a multiphase synthetic ripple voltage generator according to an exemplary embodiment of the present invention that may be used as the multiphase synthetic ripple voltage generator of the multiphase regulator of FIG. 1 for a two phase regulator.

FIG. 2 is a simplified schematic diagram of multiphase synthetic ripple voltage generator 200 according to an exemplary embodiment of the present invention that may be used as the multiphase synthetic ripple voltage generator 101 to configure the multiphase regulator 100 as a two phase regulator. It will be readily appreciated from the following description that the architecture and functionality of the multiphase synthetic ripple voltage generator 101 and its ripple generator may be readily expanded to any number of phases as desired. A two phase implementation has been shown as a reduced complexity multiphase example for purposes of reducing the complexity of the drawings and their attendant description.

The multiphase synthetic ripple voltage generator 101 includes a 'master' hysteretic comparator formed of upper and lower threshold comparators 210 and 220, outputs of which are respectively coupled to the set (S) and reset (R) inputs of an SR flip-flop 230. An inverting (−) input 211 of the comparator 210 is coupled to receive an upper threshold voltage Vupper, while a non-inverting (+) input 221 of the comparator 220 is coupled to receive a lower threshold voltage Vlower, which is some prescribed offset ΔV/2 lower than the upper threshold voltage Vupper. The Vupper signal is a reference or "error" signal generated by an error amplifier 103, which receives a reference voltage VREF at its non-inverting (+) input and the output signal VO at its inverting (−) input. The non-inverting (+) input 212 of the comparator 210 and the inverting (−) input 222 of the comparator 220 are coupled to a common terminal 241 of a controlled switch 240, and also to a ripple capacitor 245, which is referenced to ground. Switch 240 is controlled by the non-inverting Q output of flip-flop 230.

A first input terminal 242 of switch 240 is coupled to the output of a transconductance amplifier 250, while a second input terminal 243 of switch 240 is coupled to the output of a transconductance amplifier 260. Transconductance amplifier 250 has a non-inverting (+) input 251 coupled to receive the input voltage VIN, while the inverting (−) input 252 thereof is coupled to receive the output voltage VO. The input voltages VIN1–VINN are each the same voltage level, shown as VIN. Transconductance amplifier 250 produces an output current proportional to the difference between its inputs, namely proportional to VIN–VO. Transconductance amplifier 260 has its non-inverting (+) input 261 coupled to ground and its inverting input 262 coupled to receive the output voltage VO. Transconductance amplifier 260 produces an output current proportional to the difference between its inputs, namely proportional to 0–VO or −VO.

The inverting or QBAR output of flip-flop 230 is coupled to a sequence logic circuit 270. Sequence logic circuit 270, which may be implemented as a counter, has N outputs corresponding to the number of phases being generated. In the present two phase example, sequence logic circuit 270 has a first output 271 coupled to the SET input of a SET/RESET flip-flop 280 and a second output 272 coupled to the SET input of a SET/RESET flip-flop 290. For this purpose, sequence logic 270 may be implemented as a flip-flop for a two-phase application, or a shift register for an application with more than two phases. The RESET input of flip-flop 280 is coupled to the output of a comparator 300, while the RESET input of flip-flop 290 is coupled to the output of a comparator 310.

The non-inverting (+) inputs 301 and 311 of the comparators 300 and 310, respectively, are coupled to receive the upper threshold voltage Vupper. The inverting (−) input 302 of comparator 300 is coupled to receive a PHASE1 RIPPLE voltage signal that is developed across a ripple capacitor 305 as a result of current supplied to the capacitor 305 by the output of a PHASE 1 transconductance amplifier 320. The inverting (−) input 312 of comparator 310 is coupled to receive a PHASE2 RIPPLE voltage signal that is developed across a ripple capacitor 315 as a result of current supplied to the capacitor 315 by the output of a PHASE 2 transconductance amplifier 330. The capacitors 245, 305 and 315 are "ripple" capacitors shown labeled "$C_{RIP}$".

The transconductance amplifier 320 has a non-inverting (+) input coupled to the $V_{PHASE1}$ node and an inverting (−) input coupled to receive the output voltage VO. The $V_{PHASE1}$ node develops a voltage $V_{PHASE1}$ which is controllably gated in accordance with the PWM1 signal provided at the output of the flip-flop 280. Thus, the transconductance amplifier 320 generates the PHASE1 RIPPLE signal having a voltage proportional to the integral of $V_{PHASE1}$–VO. Similarly, the transconductance amplifier 330 has a non-inverting (+) input coupled to the $V_{PHASE2}$ node, and an inverting (−) input coupled to receive the output voltage VO. The $V_{PHASE2}$ node develops a voltage $V_{PHASE2}$ which is controllably gated in accordance with the PWM2 signal provided at the output of the flip-flop 290. Thus, the transconductance amplifier 330 generates the. PHASE2 RIPPLE signal having a voltage proportional to the integral of $V_{PHASE2}$–VO.

Figure 3:
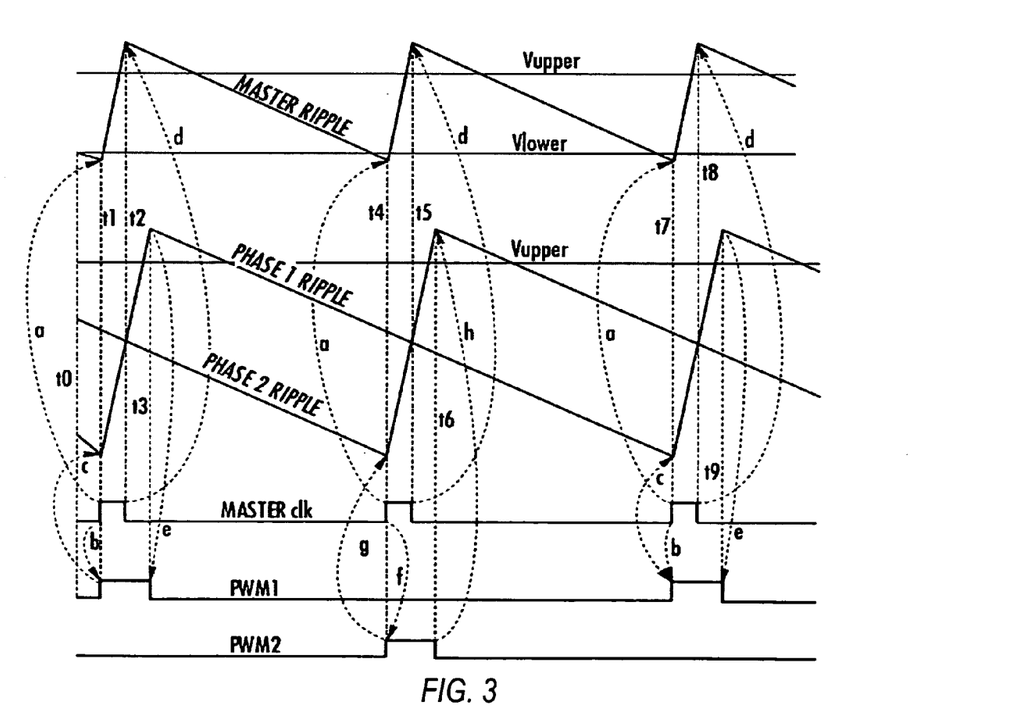
FIG. 3 shows timing diagrams illustrating operation of the multiphase regulator of FIG. 1 employing the multiphase synthetic ripple voltage generator of FIG. 2 for a two-phase system.

Operation of the multiphase regulator 100 employing the multiphase synthetic ripple voltage generator 101 for a two-phase system is readily understood with reference to the timing diagrams of FIG. 3. The MASTER RIPPLE signal is shown on top having a sawtooth form with respect to the upper and lower thresholds Vupper and Vlower, respectively. The PHASE1 RIPPLE and PHASE2 RIPPLE signals are collectively shown in the middle, each exhibiting a sawtooth behavior relative to the upper threshold Vupper and synchronized with the MASTER RIPPLE signal. It is noted that the two instances of the Vupper threshold are the same signal at the same voltage level yet repeated to more clearly illustrate the relationship with the PHASE1 RIPPLE and PHASE2 RIPPLE signals. The MASTER clk signal at the QBAR output of the flip-flop 230 and the PWM1 and PWM2 signals produced at the Q outputs of output flip-flops 280 and 290, respectively, are shown at the bottom.

The MASTER RIPPLE signal is initially shown decreasing and crossing the lower threshold Vlower at a time t0. During the interval leading up to t0, the common terminal 241 of switch 240 is connected to input terminal 243, so that a current proportional to ground (0V)–VO, or simply −VO is applied to the capacitor 245 so that the MASTER RIPPLE signal is initially decreasing. When the MASTER RIPPLE signal crosses the lower threshold Vlower, the comparator 220 is tripped at a subsequent time t1, which resets flip-flop 230. The latency between times t0 and t1 is due to second order circuit effects. When the flip-flop 230 is reset, its QBAR output asserts the MASTER clk signal high, and the sequence logic 270 asserts its output 271 high to the set input of the PWM1 output flip-flop 280. The flip-flop 280 responds by asserting the PWM1 signal high at about time t1.

Meanwhile, the Q output of flip-flop 230 goes low causing the switch 240 to couple its input 242 to the terminal 241, so that the output of the transconductance amplifier 250 is monitored by the hysteretic comparators 210 and 220. During a time interval beginning with t1, transconductance amplifier 250 produces an output current that is proportional to the difference between its inputs, namely proportional to VIN–VO. This current is applied to charge the capacitor 245, so that the MASTER RIPPLE signal increases beginning at time t1. Eventually, the MASTER RIPPLE signal exceeds Vupper causing the comparator 210 to trip and set the flip-flop 230 at a subsequent time t2, at which time the QBAR output of the flip-flop pulls the MASTER clk signal low. The MASTER clk signal stays low until the flip-flop 230 is again reset by the comparator 220.

When the flip-flop 230 is set, its Q output causes the switch 240 to connect its input 243 to its common terminal 241, so that a negative current proportional to −VO is again supplied to the capacitor 245 by the transconductance amplifier 260, causing the MASTER RIPPLE signal across capacitor 245 to decrease beginning at time t2. Eventually, at a subsequent time t4, the MASTER RIPPLE signal again crosses the lower threshold Vlower, so that comparator 220 is again tripped to reset the flip-flop 230. Operation repeats in this manner to generate the MASTER RIPPLE signal as a sawtooth waveform.

The frequency of the MASTER RIPPLE and MASTER clk signals is controlled by the input and output voltages VIN and VOUT and the relative voltages of Vupper and Vlower. Increasing VIN increases the magnitude of the current (VIN–VO) supplied by transconductance amplifier 250 to capacitor 245, and thereby reduces the time required for the MASTER RIPPLE signal to reach Vupper. Conversely, decreasing the output voltage VO not only increases the magnitude of the current (VIN–VO) supplied by transconductance amplifier 250, but decreases the magnitude of the negative current supplied by transconductance amplifier 260, the latter being effective to increase the time required for the MASTER RIPPLE signal to reach the lower threshold voltage Vlower.

The PHASE1 RIPPLE signal is initially decreasing at time t0 until time t1 when the PWM1 signal is asserted high. When the PWM1 signal goes high, the $V_{PHASE1}$ signal is driven high by operation of the gate driver GD1, so that the transconductance amplifier 320 begins to charge the capacitor 305 with a current proportional to $V_{PHASE1}$–VO causing the PHASE1 RIPPLE signal to increase beginning at about time t2. Eventually the PHASE1 RIPPLE signal exceeds Vupper tripping the comparator 300 to reset the flip-flop 280, which pulls the PWM1 signal low at a time t3. The PWM1 signal remains low until the flip-flop 280 is again set at subsequent time t7 by the sequence logic 270 in response to the MASTER clk signal. During the interval from t3 to t7, the transconductance amplifier 320 applies a negative current (based on its input of –VO) to the capacitor 305 so that the PHASE1 RIPPLE signal ramps down in linear fashion until the next cycle of the PWM1 signal at time t7.

The PHASE2 RIPPLE signal is generated by the transconductance amplifier 330 and the capacitor 315 in a similar manner as the PHASE1 RIPPLE signal, except that the two signals are 180 degrees out of phase with respect to each other. As shown, for example, the MASTER clk signal goes high at times t1, t4, t7 and so on, where the PWM1 signal goes high at times t1 and t7 and at every other pulse of the MASTER clk signal thereafter, whereas the PWM2 signal goes high at time t4 and at every other pulse of the MASTER clk signal thereafter. The PHASE1 RIPPLE signal linearly increases based on $V_{PHASE1}$–VO in response to assertion of the PWM1 signal until reaching Vupper causing the comparator 300 to reset the flip-flop 280 and negate the PWM1 signal, and then the PHASE1 RIPPLE signal linearly decreases based on –VO while PWM1 is low until it goes high again. Likewise, the PHASE2 RIPPLE signal linearly increases based on $V_{PHASE2}$–VO in response to assertion of the PWM2 signal until reaching Vupper causing the comparator 310 to reset the flip-flop 290 and negate the PWM2 signal, and then the PHASE2 RIPPLE signal decreases based on –VO while PWM2 is low until it goes high again.

The sequence logic 270 toggles assertion of its outputs 271 and 272 upon successive cycles of the MASTER clk signal for the two-phase case. For additional or N phases, the sequence logic 270 cycles through all phases one at a time in round-robin fashion upon successive cycles of the MASTER clk signal as understood by those of ordinary skill in the art.

Figure 4:
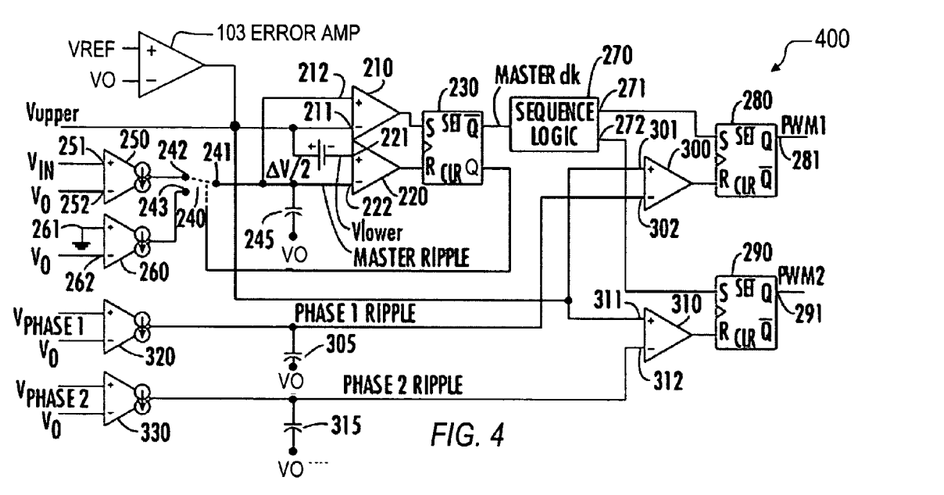
FIG. 4 is a simplified schematic diagram of a multiphase synthetic ripple voltage generator according to another exemplary embodiment of the present invention that may be used as the multiphase synthetic ripple voltage generator of the multiphase regulator of FIG. 1 for a two phase regulator in which the ripple capacitors are referenced to the output voltage.

FIG. 4 is a simplified schematic diagram of a multiphase synthetic ripple voltage generator 400 according to another exemplary embodiment of the present invention that may be used as the multiphase synthetic ripple voltage generator 101 to configure the multiphase regulator 100 as a two phase regulator. The multiphase synthetic ripple voltage generator 400 is substantially similar to the multiphase synthetic ripple voltage generator 200 in which similar components assume identical reference numbers. In this case, however, the ripple capacitors 245, 305 and 315 are referenced to the output voltage VO rather than to ground. The multiphase synthetic ripple voltage generator 400 enables faster loop response to changes in VO by including another feedback connection to VO through the ripple capacitors. The faster response is provided at the potential cost of reduced stability of the multiphase regulator 100. Again, although only the two phase case is illustrated, any number of phases is contemplated.

Figure 5:
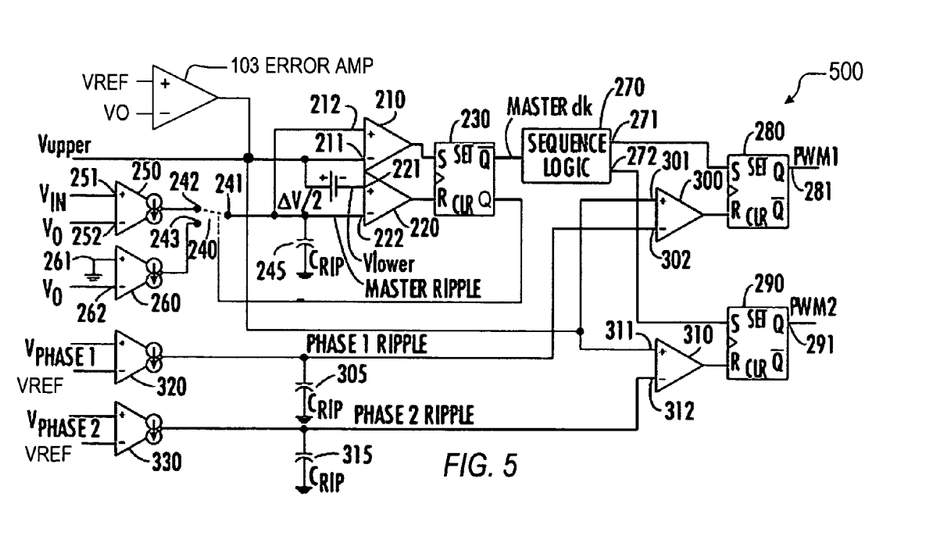
FIG. 5 is a simplified schematic diagram of a multiphase synthetic ripple voltage generator according to another exemplary embodiment of the present invention that may be used as the multiphase synthetic ripple voltage generator of the multiphase regulator of FIG. 1 for a two phase regulator in which inputs of the transconductance amplifiers of each phase receive a reference voltage.

FIG. 5 is a simplified schematic diagram of a multiphase synthetic ripple voltage generator 500 according to another exemplary embodiment of the present invention that may be used as the multiphase synthetic ripple voltage generator 101 to configure the multiphase regulator 100 as a two phase regulator. The multiphase synthetic ripple voltage generator 500 is substantially similar to the multiphase synthetic ripple voltage generator 200 in which similar components assume identical reference numbers. In this case, however, the inverting inputs of the transconductance amplifiers 320 and 330 are coupled to VREF rather than to VO. The connection to VO in the multiphase synthetic ripple voltage generator 200 results in relatively fast feedback in response to changes in VO, at a potential cost of reduced loop stability in certain configurations. VREF is constant and does not change so that the VO feedback response characteristic at the input of transconductance amplifiers 320, 330 is eliminated.

Figure 6:
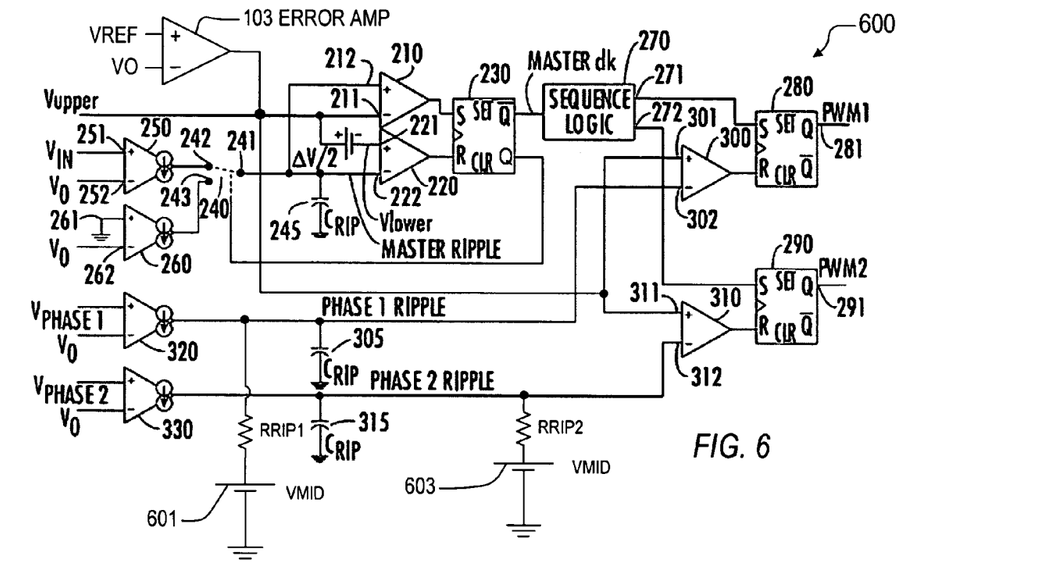
FIG. 6 is a simplified schematic diagram of a multiphase synthetic ripple voltage generator according to another exemplary embodiment of the present invention that may be used as the multiphase synthetic ripple voltage generator of the multiphase regulator of FIG. 1 for a two phase regulator including ripple resistors biased with voltage sources.

FIG. 6 is a simplified schematic diagram of a multiphase synthetic ripple voltage generator 600 according to another exemplary embodiment of the present invention that may be used as the multiphase synthetic ripple voltage generator 101 to configure the multiphase regulator 100 as a two phase regulator. The multiphase synthetic ripple voltage generator 600 is substantially similar to the multiphase synthetic ripple voltage generator 200 in which similar components assume identical reference numbers. In this case, a first ripple resistor RRIP1 has one end coupled to the output of the transconductance amplifier 320 and another end coupled to the positive terminal of the voltage source 601, having its negative terminal coupled to GND. The voltage source 601 develops a mid-supply voltage VMID having a voltage level roughly based on the voltage supply of the multiphase synthetic ripple voltage generator 101. In one embodiment in which the multiphase synthetic ripple voltage generator 101 voltage supply is 5V, VMID is approximately 1.5V. Also, a second ripple resistor RRIP2 has one end coupled to the output of the transconductance amplifier 330 and another end coupled to the positive terminal of the voltage source 603, having its negative terminal coupled to GND. The voltage source 603 also provides the mid-supply voltage VMID.

The voltage across each of the output inductors L1–LN includes a DC voltage level, due at least in part to their inherent DCRs, which otherwise continuously charges the corresponding ripple capacitors so that the voltage of each ripple capacitor may tend to rise over time. For the two-phase case, the ripple resistors RRIP1 and RRIP2 discharge the ripple capacitors 305 and 315, respectively, at the appropriate rate to compensate or otherwise prevent charge build-up. Also, in certain embodiments, the DC voltage on the capacitors 305, 315 may go too high and/or too low, so that it is referenced to the mid-supply voltage VMID via the relatively large resistor RRIP1/RRIP2. A similar ripple resistor and voltage source is provided for each channel and coupled in a similar manner. The RC time constant of the ripple capacitor and the ripple resistor for each channel creates a "zero" in the transfer function of the multiphase regulator 100 for that channel. The effect of the zero is taken into account when selecting the specific component values to make each regulation loop stable.

Figure 7:
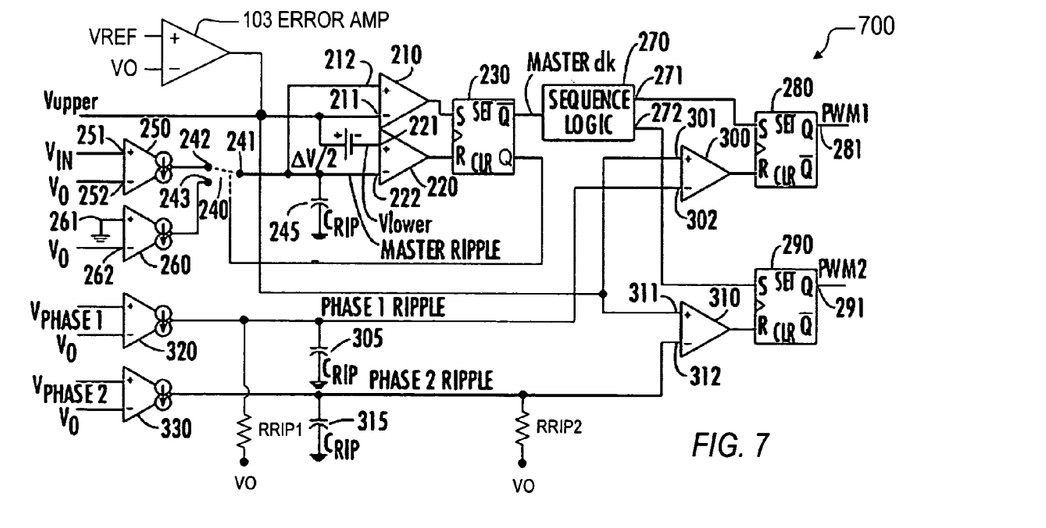
FIG. 7 is a simplified schematic diagram of a multiphase synthetic ripple voltage generator according to another exemplary embodiment of the present invention that may be used as the multiphase synthetic ripple voltage generator of the multiphase regulator of FIG. 1 for a two phase regulator including ripple resistors referenced to the output voltage.

FIG. 7 is a simplified schematic diagram of a multiphase synthetic ripple voltage generator 700 according to another exemplary embodiment of the present invention that may be used as the multiphase synthetic ripple voltage generator 101 to configure the multiphase regulator 100 as a two phase regulator. The multiphase synthetic ripple voltage generator 700 is substantially similar to the multiphase synthetic ripple voltage generator 600 in which similar components assume identical reference numbers. In this case, the ripple resistors RRIP1, RRIP2 are coupled to the VO output signal rather than to VMID. This embodiment eliminates the need for a separate voltage supply for VMID and provides better compensation for variations of VO in various configurations.

Figure 8:
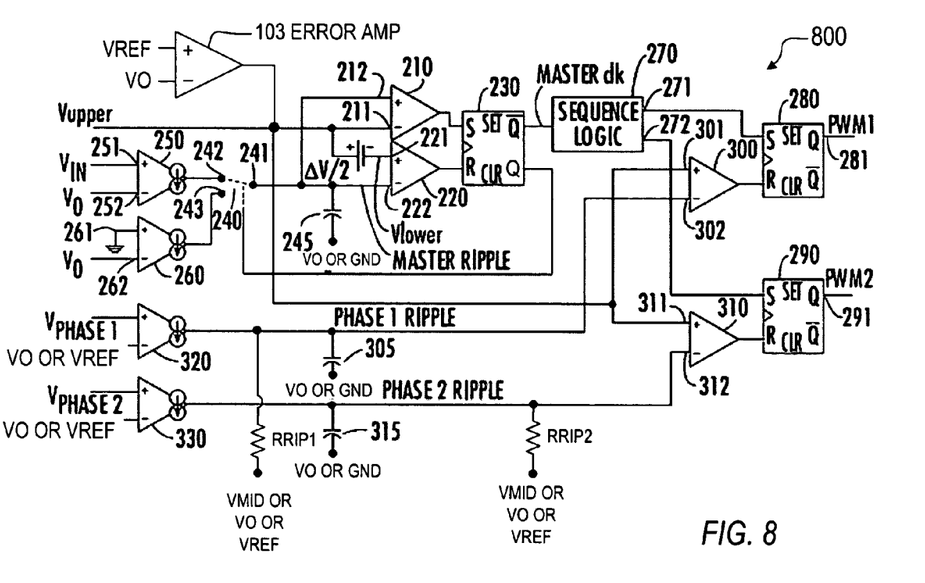
FIG. 8 is a schematic diagram of a multiphase synthetic ripple voltage generator illustrating that any one or more of the variations of the multiphase synthetic ripple voltage generators of FIGS. 2 and 3–7 may be applied in any combination as appreciated by those of ordinary skill in the art.

FIG. 8 is a schematic diagram of multiphase synthetic ripple voltage generator 700 illustrating that any one or more of the variations of the multiphase synthetic ripple voltage generators 200 and 300–700 may be applied in any combination as appreciated by those of ordinary skill in the art. Again, similar components assume identical reference numbers. As illustrated, the inverting inputs of the transconductance amplifiers 320, 330 are either coupled to VREF or VO, the ripple capacitors 305, 315 are either referenced to VO or GND, and the ripple resistors RRIP1/RRIP2 are optionally included and referenced to any selected voltage level including VMID, VO or VREF. Thus, any combination of the described variations is contemplated.

Figure 9:
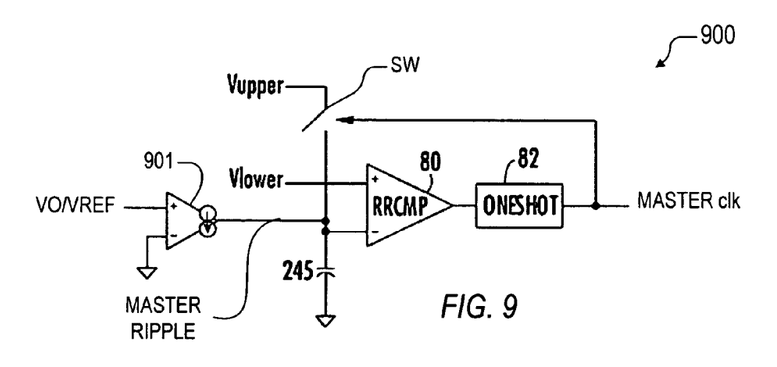
FIG. 9 is a schematic diagram of a master clock circuit illustrating an alternative method for generating the master clock signal and the MASTER RIPPLE developed across the ripple capacitor.

FIG. 9 is a schematic diagram of a master clock circuit 900 illustrating an alternative method for generating the MASTER RIPPLE developed across the capacitor 245 and the MASTER clk signal. A transconductance amplifier 901 has its non-inverting input coupled to receive a selected one of VO or VREF and its inverting input coupled to ground. The output of the transconductance amplifier 901 is coupled to the capacitor 245 referenced to ground (or alternatively referenced to VO), to the inverting input of a comparator 80, and to one terminal of a normally open, single-pole, single-throw (SPST) switch SW. The other terminal of the switch SW receives the Vupper signal. The non-inverting input of the comparator 80 receives the Vlower signal, and its output is coupled to the input of a one-shot 82. The output of the one-shot 82 generates the MASTER clk signal, which is provided to the control input of the switch SW.

In operation, the SW is initially open decoupling the capacitor 245 from Vupper. The capacitor 245 is continuously discharged by a current proportional to either VREF or VO. When the voltage across capacitor 245 drops below or crosses the threshold Vlower, the output of the comparator 80 goes high firing the one-shot 82 to generate a pulse of the MASTER clk signal. The MASTER clk signal goes high closing the SW, so that the voltage across the capacitor 245 is quickly reset to the value of Vupper. The one-shot 82 resets the MASTER clk signal low after a relatively short period, so that the switch SW is once again opened to allow the transconductance amplifier 901 to discharge the capacitor 245.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claim(s).

What is claimed is:

1. A multiphase synthetic ripple voltage generator for a multiphase DC-DC regulator which includes a plurality of switching circuits each responsive to a corresponding one of a plurality of pulse width modulation (PWM) signals to switch at least one input voltage via a corresponding one of a plurality of phase nodes through a corresponding one of a plurality of output inductors to develop an output voltage at an output node, said multiphase synthetic ripple voltage generator comprising:
   a master clock circuit that generates a master clock signal;
   sequence logic that sets each of the plurality of PWM signals in sequential order based on said master clock signal; and
   a plurality of ripple generators, each comprising:
      a transconductance amplifier having an input for coupling to a corresponding one of the output inductors and an output;
      a ripple capacitor coupled to said output of said transconductance amplifier; and
      a comparator, having a first input coupled to said ripple capacitor, a second input coupled to receive an error voltage, and an output coupled to said sequence logic for resetting a corresponding one of the plurality of PWM signals.

2. The multiphase synthetic ripple voltage generator of claim 1, wherein said transconductance amplifier has a non-inverting input for coupling to a corresponding one of the plurality of phase nodes and an inverting input for coupling to the output node.

3. The multiphase synthetic ripple voltage generator of claim 1, wherein said transconductance amplifier has a non-inverting input for coupling to a corresponding one of the plurality of phase nodes and an inverting input for coupling to a reference voltage.

4. The multiphase synthetic ripple voltage generator of claim 1, wherein said ripple capacitor has a first end coupled to said output of said transconductance amplifier and a second end for coupling to the output node.

5. The multiphase synthetic ripple voltage generator of claim 1, wherein said ripple capacitor has a first end coupled to said output of said transconductance amplifier and a second end coupled to ground.

6. The multiphase synthetic ripple voltage generator of claim 1, wherein each of said plurality of ripple generators further comprises a ripple resistor coupled to said ripple capacitor.

7. The multiphase synthetic ripple voltage generator of claim 6, wherein said ripple resistor has a first end coupled to said ripple capacitor and a second end for coupling to the output node.

8. The multiphase synthetic ripple voltage generator of claim 6, wherein each of said plurality of ripple generators further comprises:
   a voltage source referenced to ground; and
   said ripple resistor having a first end coupled to said ripple capacitor and a second end coupled to said voltage source.

9. The multiphase synthetic ripple voltage generator of claim 1, wherein each of the at least one input voltage comprises a single input voltage, and wherein said master clock circuit comprises:
   a master ripple capacitor;
   a master transconductance amplifier circuit having an output coupled to said master ripple capacitor and having first and second states controlled by said master clock signal, said first state for charging said master ripple capacitor based on a voltage difference between the input voltage and the output voltage and said second state for discharging said master ripple capacitor based on the output voltage; and
   a hysteretic comparator circuit having an input coupled to compare the voltage of said master ripple capacitor with the error voltage and an output that provides said master clock signal.

10. The multiphase synthetic ripple voltage generator of claim 9, wherein said master transconductance amplifier circuit comprises:
   a first master transconductance amplifier having a first input for receiving the input voltage, a second input for receiving the output voltage and an output;

a second master transconductance amplifier having a first input coupled to ground, a second input for receiving the output voltage and an output; and a switch circuit having a first terminal coupled to said output of said first master transconductance amplifier, a second terminal coupled to said output of said second master transconductance amplifier, a common terminal coupled to said master ripple capacitor, and a control input that receives a signal indicative of said master clock signal for coupling said common terminal to a selected one of said first and second terminals.

11. The multiphase synthetic ripple voltage generator of claim 9, wherein said hysteretic comparator circuit comprises:

a first comparator having a first input coupled to said master ripple capacitor, a second input receiving said error voltage, and an output;

a voltage source providing an offset voltage relative to said error voltage;

a second comparator having a first input receiving said offset voltage, a second input coupled to said master ripple capacitor, and an output; and a set-reset device having a first input coupled to said output of said first comparator, a second input coupled to said output of said second comparator, and an output providing said master clock signal.

12. The multiphase synthetic ripple voltage generator of claim 1, wherein said master clock circuit comprises:

a master ripple capacitor;

a master transconductance amplifier having an input for receiving the output voltage and an output coupled to said master ripple capacitor;

a voltage source providing an offset voltage relative to said error voltage;

a comparator having a first input coupled to said master ripple capacitor, a second input receiving said offset voltage, and an output;

a one-shot device having an input coupled to said output of said comparator and an output providing said master clock signal; and a switch having a first terminal coupled to receive said error voltage, a second terminal coupled to said master ripple capacitor, and a control input receiving said master clock signal.

13. The multiphase synthetic ripple voltage generator of claim 1, wherein said master clock circuit comprises:

a master ripple capacitor;

a master transconductance amplifier having an input receiving a reference voltage indicative and an output coupled to said master ripple capacitor;

a voltage source providing an offset voltage relative to said error voltage;

a comparator having a first input coupled to said master ripple capacitor, a second input receiving said offset voltage, and an output;

a one-shot device having an input coupled to said output of said comparator and an output providing said master clock signal; and a switch having a first terminal coupled to receive said error voltage, a second terminal coupled to said master ripple capacitor, and a control input receiving said master clock signal.

14. A multiphase synthetic ripple regulator, comprising:

a plurality of switching circuits, each alternately coupling a corresponding one of a plurality of phase nodes to opposite polarities of a corresponding one of a plurality of input voltages based on a corresponding one of a plurality of pulse width modulation (PWM) signals;

a plurality of output inductors, each coupled between a corresponding one of said plurality of phase nodes and an output node that develops a regulated output voltage;

an error amplifier that generates an error voltage based on said regulated output voltage compared to a reference voltage;

a hysteretic comparator clock circuit, responsive to said output voltage and said error signal, that generates a master clock signal;

sequence logic that initiates each of said plurality of PWM signals in sequential order based on said master clock signal; and a plurality of ripple generators, each comprising:

a transconductance amplifier having an input for coupling to a corresponding one of said plurality of phase nodes and an output;

a ripple capacitor coupled to said output of said transconductance amplifier; and a comparator, having a first input coupled to said ripple capacitor, a second input receiving said error voltage, and an output coupled to said sequence logic for terminating a corresponding one of said plurality of PWM signals.

15. The multiphase synthetic ripple regulator of claim 14, wherein said transconductance amplifier has a non-inverting input coupled to a corresponding one of said plurality of phase nodes and an inverting input coupled to said output node.

16. The multiphase synthetic ripple regulator of claim 14, wherein said transconductance amplifier has a non-inverting input couple to a corresponding one of said plurality of phase nodes and an inverting input coupled to receive said reference voltage.

17. The multiphase synthetic ripple regulator of claim 14, wherein said ripple capacitor has a first end coupled, to said output of said transconductance amplifier and a second end coupled to said output node.

18. The multiphase synthetic ripple regulator of claim 14, wherein said ripple capacitor has a first end coupled to said output of said transconductance amplifier and a second end coupled to ground.

19. The multiphase synthetic ripple voltage generator of claim 14, wherein each of said plurality of ripple generators further comprises a ripple resistor coupled to said ripple capacitor.

20. The multiphase synthetic ripple regulator of claim 19, wherein said ripple resistor has a first end coupled to said ripple capacitor and a second end coupled to said output node.

21. The multiphase synthetic ripple regulator of claim 19, wherein each of said plurality of ripple generators further comprises:

a voltage source referenced to ground; and said ripple resistor having a first end coupled to said ripple capacitor and a second end coupled to said voltage source.

22. The multiphase synthetic ripple regulator of claim 14, wherein said plurality of input voltages comprises a single input voltage, and wherein said hysteretic comparator clock circuit comprises:

a master ripple capacitor;

a master transconductance amplifier circuit having a first output providing a first current proportional to a voltage difference between said input voltage and said output voltage and a second output providing a second current proportional to said output voltage;

a switch circuit that couples said first output of said master transconductance amplifier circuit to charge said master ripple capacitor with said first current when said master clock signal is in a first state and that couples said second output of said master transconductance amplifier circuit to discharge said master ripple capacitor with said second current when said master clock signal is in a second state; and a hysteretic comparator circuit having a first input coupled to said master ripple capacitor, a second input receiving said error voltage, and an output that provides said master clock signal.

23. The multiphase synthetic ripple regulator of claim 22, wherein said master transconductance amplifier circuit comprises:

a first master transconductance amplifier having a first input coupled to receive said input voltage, a second input coupled to said output node and an output providing said first current; and a second master transconductance amplifier having an input coupled to said output node and an output providing said second current.

24. The multiphase synthetic ripple regulator of claim 22, wherein said hysteretic comparator circuit comprises:

a first comparator having a first input coupled to said master ripple capacitor, a second input receiving said error voltage, and an output;

a voltage source providing an offset voltage relative to said error voltage;

a second comparator having a first input receiving said offset voltage, a second input coupled to said master ripple capacitor, and an output; and a set-reset device having a set input coupled to said output of said first comparator, a reset input coupled to said output of said second comparator, a first inverting output providing said master clock signal, and a second non-inverting output coupled to control said switch circuit.

25. The multiphase synthetic ripple regulator of claim 14, wherein said hysteretic comparator clock circuit comprises:

a master ripple capacitor;

a master transconductance amplifier having an input coupled to said output node and an output coupled to said master ripple capacitor;

a voltage source providing an offset voltage relative to said error voltage;

a comparator having a first input coupled to said master ripple capacitor, a second input coupled to said voltage source, and an output;

a one-shot device having an input coupled to said output of said comparator and an output providing said master clock signal; and a switch having a first terminal coupled to receive said error voltage, a second terminal coupled to said master ripple capacitor, and a control input receiving said master clock signal.

26. The multiphase synthetic ripple regulator of claim 14, wherein said hysteretic comparator clock circuit comprises:

a master ripple capacitor;

a master transconductance amplifier having an input coupled to receive said reference voltage and an output coupled to said master ripple capacitor;

a voltage source providing an offset voltage relative to said error voltage;

a comparator having a first input coupled to said master ripple capacitor, a second input receiving said offset voltage, and an output;

a one-shot device having an input coupled to said output of said comparator and an output providing said master clock signal; and a open switch having a first terminal coupled to receive said error voltage, a second terminal coupled to said master ripple capacitor, and a control input receiving said master clock signal.

* * * * *